Dec. 4, 1962  V. L. SAILOR ETAL  3,067,365
GUIDE FOR POLARIZED NEUTRONS
Filed April 7, 1961  5 Sheets-Sheet 1

INVENTORS
RICHARD W. AICHROTH
VANCE L. SAILOR
BY

INVENTOR.
RICHARD W AICHROTH
VANCE L. SAILOR

Dec. 4, 1962 V. L. SAILOR ETAL 3,067,365
GUIDE FOR POLARIZED NEUTRONS
Filed April 7, 1961 5 Sheets-Sheet 3

INVENTOR.
RICHARD W. AICHROTH
VANCE L. SAILOR
BY

Dec. 4, 1962 V. L. SAILOR ETAL 3,067,365
GUIDE FOR POLARIZED NEUTRONS
Filed April 7, 1961 5 Sheets-Sheet 4

INVENTOR.
RICHARD W. AICHROTH
BY VANCE L. SAILOR

Dec. 4, 1962  V. L. SAILOR ETAL  3,067,365
GUIDE FOR POLARIZED NEUTRONS
Filed April 7, 1961  5 Sheets-Sheet 5

*INVENTOR.*
RICHARD W. AICHROTH
VANCE L. SAILOR
BY 3,067,365
GUIDE FOR POLARIZED NEUTRONS
Vance L. Sailor, East Patchogue, and Richard W. Aichroth, Islip, N.Y., assignors to the United States of America as represented by the United States Atomic Energy Commission
Filed Apr. 7, 1961, Ser. No. 101,603
4 Claims. (Cl. 317—200)

This invention relates to systems for the control and manipulation of neutrons and more particularly to apparatus for guiding and changing the plane of polarization of polarized neutrons.

Neutrons possess certain unique qualities including electrical neutrality and polarizability that have been useful in research activities. The quality of electrical neutrality has permitted the neutrons to pass to the center of atoms and close to charged particles such as electrons and protons, and the quality of polarizability has been advantageously used in the direct exploration of the magnetic structure of iron and other similar materials. In the process of penetrating deeply into the iron and passing through the individual iron atoms, polarized neutrons have been affected by the magnetic fields of the individual atoms and by studying the way in which the neutrons have been deflected, changed in direction of polarization and depolarized, detailed diagrams of the shape, size and orientation of the magnetic field domains inside the iron have been possible. Moreover, polarized neutrons have been used to produce compound nuclei, and to detect and measure the properties and polarization of target nuclei. In these uses the neutrons have usually been thermal or epi-cadmium neutrons, i.e., of energies less than 10 electron volts, and the neutrons have been obtained from nuclear reactors inasmuch as such reactors have made available large numbers of neutrons of suitable energy ranges.

One system for manipulating a beam of neutrons for one or more of the mentioned research purposes has included obtaining a beam of unpolarized neutrons from a hole in the shielding of a nuclear reactor and directing the beam at a neutron polarizer. One such polarizer has included a neutron crystal spectrometer having a magnetized 94% cobalt-6% iron single crystal from which monochromatic polarized neutrons have been obtained by Bragg reflection. Such a crystal has achieved polarizations higher than 98% in first order reflections. In the case of second order reflections, that have been polarized in the opposite direction, these have been filtered by a second crystal of quartz or the like. The polarized neutron beam has been collimated, the plane of polarization has been made to coincide with the plane of polarization of target nuclei, and the manipulated polarized neutrons have been directed at polarized target nuclei, including In or Ho nuclei. The target nuclei have been polarized by holding the target sample in a strong external magnetic field at very low temperature (about 1° Kelvin or less) with the plane of polarization of the target corresponding with the direction of the field. By bombarding the target nuclei, with a beam of highly polarized neutrons that have been polarized in the plane of polarization of the target nuclei, it has been possible to produce compound nuclei, to determine the angular momentum of the compound nuclei produced and to make other investigations such as those mentioned above. It has been particularly significant that by suitable manipulating or flipping the plane of polarization of the polarized neutrons from parallel (T+) to anti-parallel (T−) with respect to the magnetic field applied to the target nuclei, it has been possible to determine the spin of the compound nuclei at particular resonances by determining the relative difference $(T^+ - T^-)/(T^+ + T^-)$ in transmission for the neutrons from the parallel to anti-parallel condition. Also such flipping can reduce the counting time required to obtain a given accuracy by a factor of four over the results obtained with a beam polarized in one direction only.

One flipping means that has been used heretofore has employed radiofrequency nuclear magnetic resonance. In this system an on-off oscillator has been used to either flip or transmit and it has required an extremely stable oscillator which has resulted in considerable expense and complexity. Also the variation in the magnetic field required around the oscillator has been required to be less than two parts per million such that it has been extremely difficult to reproduce the field required and frequent empirical adjustments have been required. It has been universally recognized, therefore, that a simpler, more easily adjustable and more inexpensive device has been required. Additionally, it has been desirable that the flipping be accomplished in two directions that the flipping from one direction to another and back again be accomplished in a short time, and that the flipping mechanism uniformly and efficiently flip large numbers of the neutrons received by the mechanism.

This invention contemplates a guide for a polarized neutron beam comprising a plurality of magnets directed oppositely normal to the beam axis and having adjacent poles of opposite polarity forming coaxial gaps through which the beam freely passes, said gaps being spaced longitudinally along the beam axis at uniform, small periodically spaced intervals and spiraling around the beam axis at uniform, small stepped angles from the plane of polarization of the beam, and means for uniformly and incrementally changing the relative position of the magnets in two directions so as to rotate the plane of polarization of the beam uniformly and incrementally quickly to the left and to the right substantially without removing neutrons from said beam.

The above and further novel features of this invention will appear more fully from the following detailed description when the same is read in connection with the accompanying drawings. It is to be expressly understood, however, that the drawings are not intended as a definition of the invention but are for the purposes of illustration only.

In the drawings whose like parts are marked alike:

Figure 1:
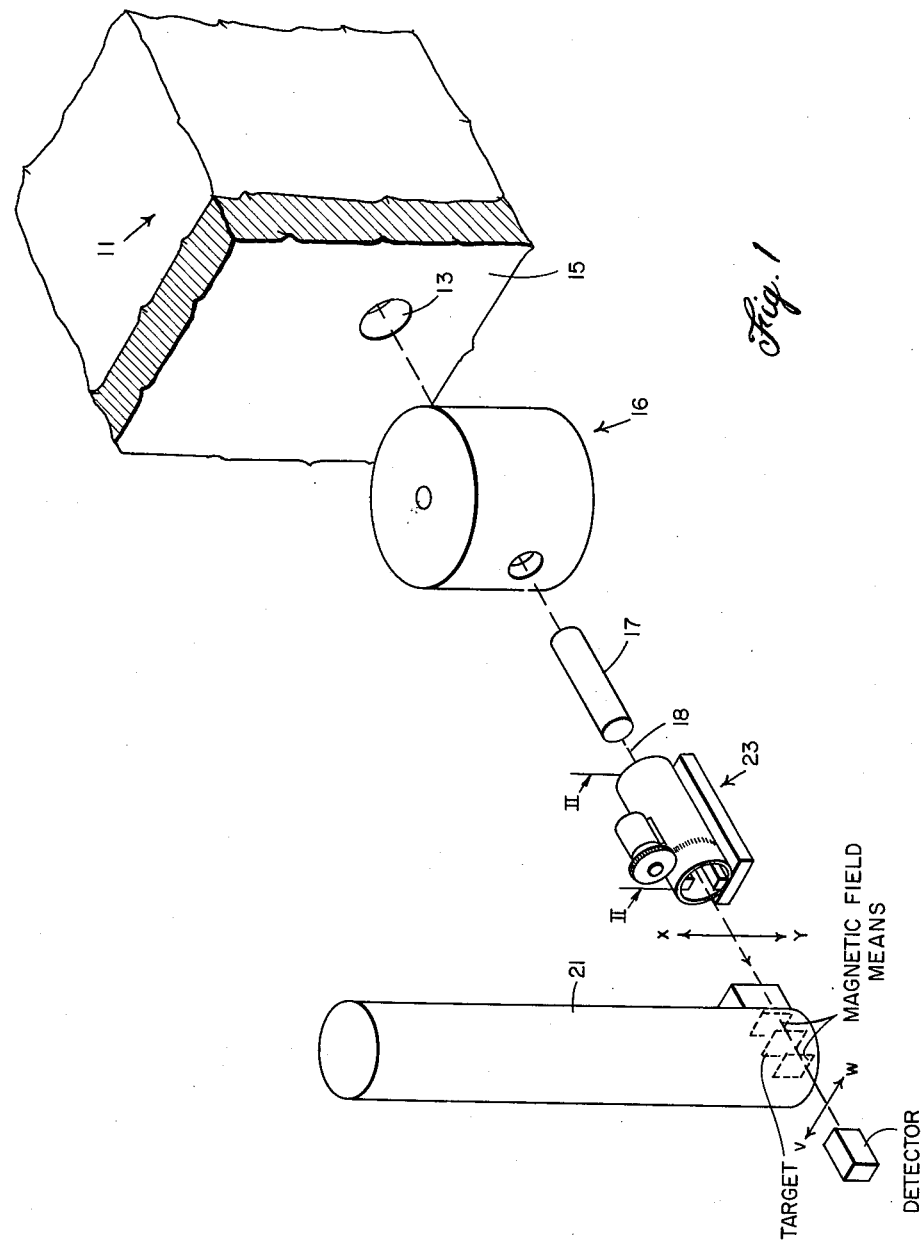
FIG. 1 is a schematic view of apparatus incorporating the novel guide of this invention.

Referring now to FIG. 1, nuclear reactor 11, partly shown for the sake of simplicity, provides large numbers of unpolarized neutrons and a cylindrical hole 13 in shielding 15 of the reactor 11 forms the neutrons into a beam. The hole 13 directs the beam at a suitable polarizer such as a suitable crystal spectrometer 16 which polarizes the neutrons in the beam in a vertical plane of polarization X—Y with X corresponding to a pole designated hereinafter as the north pole thereof. Other planes of polarization have been inconvenient due, for example, to the bulkiness of the components involved. A conventional neutron collimator 17 collimates the polarized neutrons and directs them in a beam 18 at a target nuclei such as an $In^{115}$ target that is held in a suitable high strength magnetic field having a horizontal plane of polarization V—W with W corresponding to a pole hereinafter designated as the north pole thereof. The horizontal plane V—W also has been used due to the complexity of arranging the components to produce any other plane of polarization. A suitable cryostat 21 also maintains the target at low temperatures.

As is well known, it is highly desirable to provide means for manipulating the direction of the polarized neutron spins relative to the magnetic field in which the target material is held. The devices known heretofore, however, were complicated, expensive, only manipulated the plane of polarization in one direction from a flip to a transmit condition, were inefficient, required time consuming empirical adjustment or were otherwise disadvantageous. This invention overcomes the disadvantages known heretofore and provides a simple, inexpensive device that quickly, uniformly and suitably rotates the plane of polarization of the beam 18 and efficiently transmits uniform large numbers of the neutrons in the beam.

Figure 2:
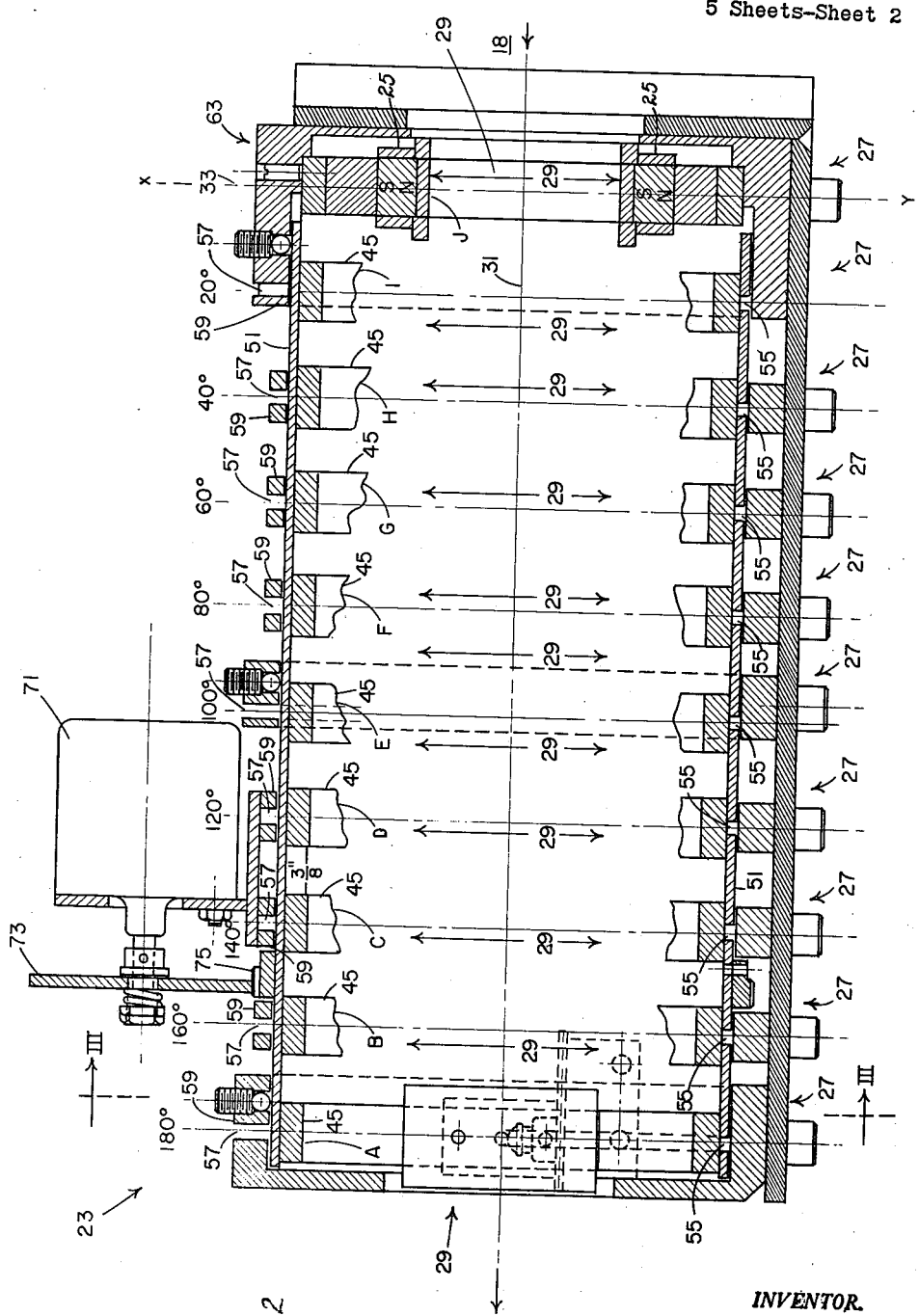
FIG. 2 is a partial cross section of the guide of FIG. 1 through II—II.

Referring to FIG. 2, in accordance with one embodiment 23, this invention contemplates a plurality of constant strength magnets 25 arranged in pairs 27 with opposite adjacent poles forming coaxial gaps 29 spaced at uniform, small, periodically spaced intervals longitudinally along the beam axis 31. An axis 33 of each magnet pair 27, for example, the axis 33 of magnets 35 and 37 shown in FIG. 3, passes through the beam axis at right angles thereto and all the axes 33 taken together spiral around the beam axis at uniform, small stepped angles from the plane of polarization of the beam 18 along the beam axis 31. Means 71 rotates these magnet axes 33 sequentially and incrementally in a positive manner and as will be understood in more detail hereinafter, causes the magnets of guide 23 to flip the plane of polarization of the beam in an efficient, exact, quick-acting and trouble-free manner.

Advantageously, the magnets 25 are commercially available solid cylindrical permanent magnets having a uniform strength of 200 gauss or over. The magnets are arranged so that the magnets have opposite adjacent poles. Thus magnet 35 has its north pole adjacent and directed toward the south pole of magnet 37. Additionally, each magnet has a means for evenly distributing the magnetic lines of force therefrom. To this end, each magnet advantageously has a rectangular bar shaped member 41 with ends 43 that are curved around the beam 18 as the beam passes through the magnet pairs.

Figure 3:
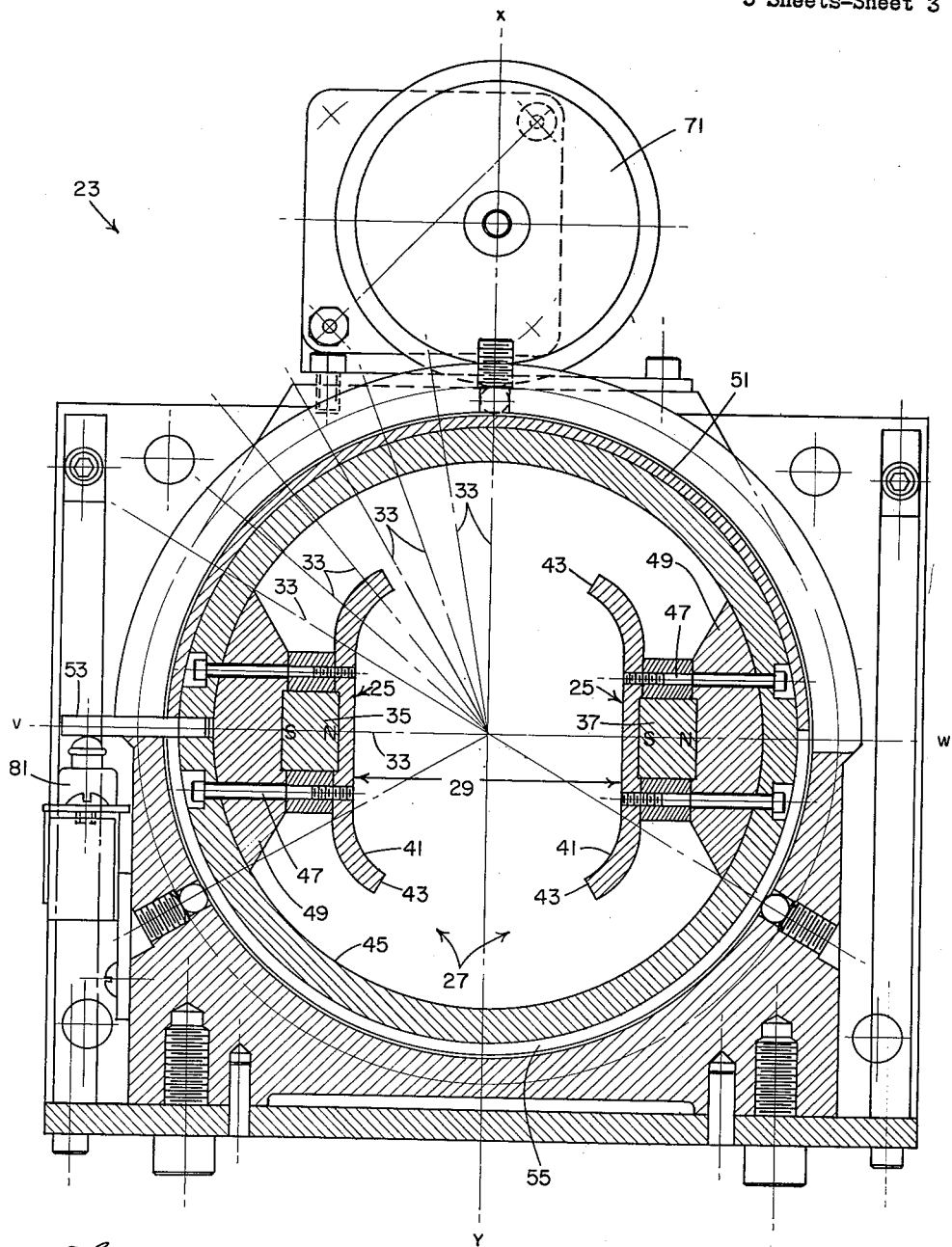
FIG. 3 is a partial cross section of the guide of FIG. 2 through III—III.
Figure 4:
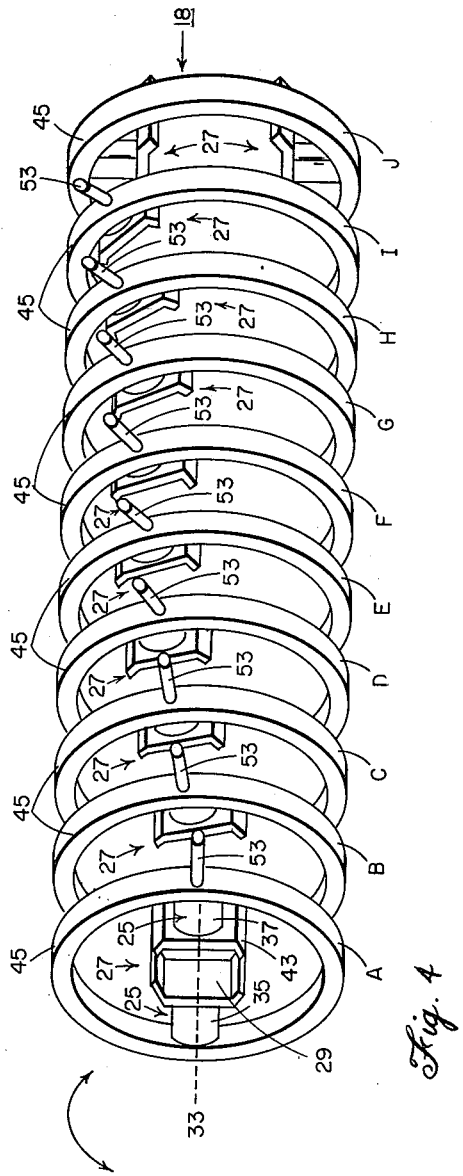
FIG. 4 is a partial isometric view of the magnets and their supports of FIG. 2.

Rings 45 are shown in FIG. 4 as rings A—J and these rings hold the magnets in the pairs 27. To this end, as shown in FIG. 3, bolts 47 pass through the rings 45 and through the curved bar shaped members 41 so as to hold the magnets 25 interposed between the members 41 and the rings 45. Spacers 49 between the magnets and rings 45 may be used to vary the distance from the magnets to the beam axis and thus vary the distance across the gaps 29 formed by the magnets and through which the beam 18 passes. Advantageously, the spacers and magnets have uniform thicknesses so that the distance across each of the gaps 29 is uniformly the same as the diameter of the inside of collimator 17.

Ring J is fixed so that its axis 33 and direction of its magnets coincide with the plane and direction of polarization of beam 18. The other rings 45 from I—A are rotatable with and in cylinder 51. Also rings 45 have pins 53 on their outsides that fit into slots 55 in cylinder 51 and slots 57 in supports 59 in which the cylinder is rotatable. The slots 55 and the slots 57 are spaced at uniform small periodic intervals longitudinally along the axis 31 of the beam 18 so that the gaps 29 formed by the magnets are spaced coaxially from ring J longitudinally along the beam axis 31 at uniform small periodically spaced intervals. A suitable interval is an interval of up to ⅝ of an inch between adjacent magnet pairs.

The direction of pins 53 coincides with the direction of the axes 33 of the magnet pairs with which the pins are associated. The pins 53 slide in slots 55 in cylinder 51, numbered from $A_1$–$I_1$, and slide in slots 57 in support 59, numbered from $A_{11}$–$I_{11}$, so that the axes 33 of magnet pairs are adapted to spiral around the beam axis at uniform stepped angles. To this end, the slots 55 and 57 in the cylinder 51 and support 59 are non-continuous and their ends are stepped at uniform small angles from each other so as to be formed respectively along two helixes converging uniformly toward each other and a point 61 at end 63 of guide 23. If the angle of rotation is too large the rotation will be inefficient. Advantageously, the angle of the steps is 10° from one magnet pair to the next.

Point 61 advantageously falls on the axis 33 of the magnets of ring J and the slot 57 in support 59 that is closest to the point 61, i.e., slot $I_{11}$, is the shortest slot. Advantageously, it forms an arc 20° long. The other support slots 57 increase progressively in the length of their arcs in 20° increments until the length of the arc formed by the slot that is farthest from the point 61, i.e., slot $A_{11}$, is the longest slot 57 and forms an arc 180° in length. The slot 55 in cylinder 57 that is closest to the point 61, i.e., slot $I_1$, is the longest slot 55 and is formed on an arc 160° in length. The other slots 55 decrease progressively in the length of their arcs therefrom in 20° increments so that the slot 55 that is farthest from the point 61, i.e., slot $A_1$, is the shortest slot 55 and is formed on an arc approximately 0° in length. Slot $A_1$ is, however, big enough for pin 53 of ring A to fit snugly therein. The arcs of the slots 55 and 57 also line up so that all the arcs thereof are adapted to be bisected by a plane X—Y along beam axis 18.

Slots 55 overlap slots 57 and rings 45 have a friction fit with cylinder 51 so that the rings 45 will rotate with cylinder 51 while pins 53 slide in support slots 57. The sliding of pins 53 in slots 57 is stopped by either the left ends L or the right end R of slots 57 in support 59. For example, as shown in FIG. 4, the pins are all stopped in positions corresponding to the left ends of the support slots 57 and the pins 53 as well as the axes 33 of the magnet pairs selectively spiral in uniform small stepped increments to the left of the vertical plane of polarization of beam 18 X—Y. From this position, the rotation of cylinder 51 selectively moves the pins 53 and axes 33 correspondingly therewith from the right end R of slots 57 to the left hand end L of the slots 57, i.e., to a position illustrated for example in FIG. 3. The increment between the ends of slots 57 is 10° on one side of the plane bisecting the slots. Thus the magnet axes 33 spiral selectively 90° to the right or 90° to the left of the vertical plane of polarization of the beam 18.

Suitable means 71 for rotating cylinder 51 for the purpose of rotating the magnet axes 33 advantageously includes an electrical motor 71 that rotates the cylinder and a suitable drive gear 73 around the outside diameter of cylinder 51. Also, the motor carries a suitable meshing gear 75 on its shaft so that the rotation of the motor selectively rotates the cylinder 51 first in one direction 180° and then in the opposite direction 180°.

The motor 71 has a suitable control system including a switch 77 having left, off and right positions that energize the motor correspondingly. Two micro-switches 81 and 83 shut the motor off when the magnets are aligned in the proper spiral position to the left or the right. To this end, ring A is the last ring to be positioned in the sequence of operation as described in more detail hereinafter and when ring A reaches its extreme proper position to the left pin 53 thereof opens microswitch 81 to de-energize the motor 71 and keep the motor from tending to turn cylinder 51 to the left. Likewise, when ring A reaches its extreme proper position to the right, pin 53 thereof opens microswitch 83 to de-energize motor 71 and keep motor 71 from tending to turn cylinder 51 too far to the right. The movement of the described pin 53 off the microswitch 81 closes that microswitch so that motor 71 can be re-energized to the right and the movement of the pin 53 off microswitch 83 closes that microswitch so that motor 71 can be re-energized to the left.

In operation, a sequence will be described looking down the cylinder 51 in the direction of the travel of beam 18 and in which the guide 23 rotates the plane of polarization of beam 18 to the left 90°, then to the right 90° and then back again to the left 90°. Ring J is optional but advantageously is positioned so that its magnets line up with the plane of polarization of beam 18 and the polarized neutrons in beam 18 freely pass through the gap 29 thereof without any change in the plane of polarization of the beam. The next successive ring I, which is spaced longitudinally along the beam axis 31 a short distance from ring J and coaxially with ring J has the axis 33 of its magnets positioned 10° to the left of the axis 33 of ring J. Thus, ring J rotates the plane of polarization of the beam 10° to the left. The next successive ring H likewise rotates the plane of polarization of the beam another 10° to the left. Likewise, succeeding rings G, F, E, D, C, B and A respectively rotate the plane of polarization of the beam incrementally 10° to the left and since there are nine movable rings that each rotate the plane of polarization incrementally 10° to the left, the resultant rotation of the plane of polarization of beam 18 totals 90° to the left.

As described, the rings are spaced coaxially along the beam axis at uniform, small spaced intervals and the axes of the magnet pairs 27 spiral around the beam axis at uniform small stepped angles as illustrated, for example, in FIG. 3. The described arrangement has the advantages that the guide 23 freely and efficiently transmits the neutrons and rotates the poles of the neutrons in the beam 90° without substantially removing neutrons or depolarizing the neutrons from the beam 18. Also, the plane of polarization of beam 18 lines up with the plane of polariaztion of the target nuclei in target 20 in plane V—W with the north poles thereof directed toward W. At this time, the positions of the pins 53 of rings A, B, C, D, E, F, G, H, are at the left hand side L of slots 55 in cylinder 51 and touch the right hand side R of slots 57 in support 59. Also, switch 77 is in the off position.

Figure 5:
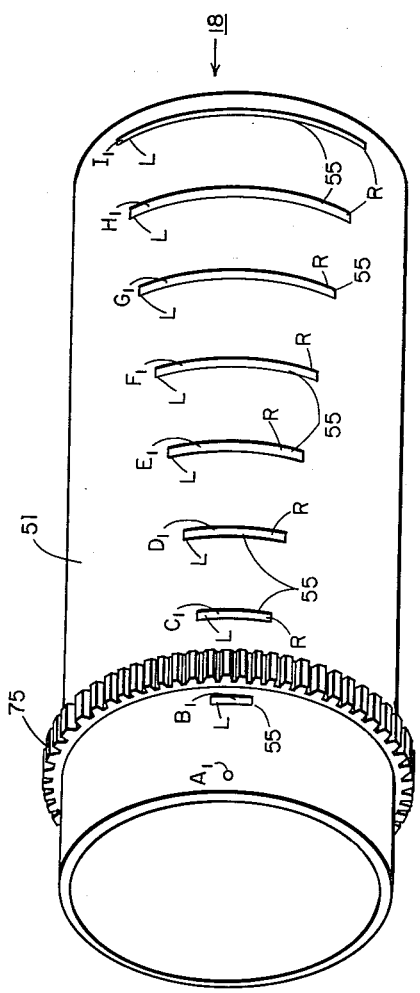
FIG. 5 is a partial isometric view of the actuating cylinder that fits on the supports of FIG. 4.
Figure 6:
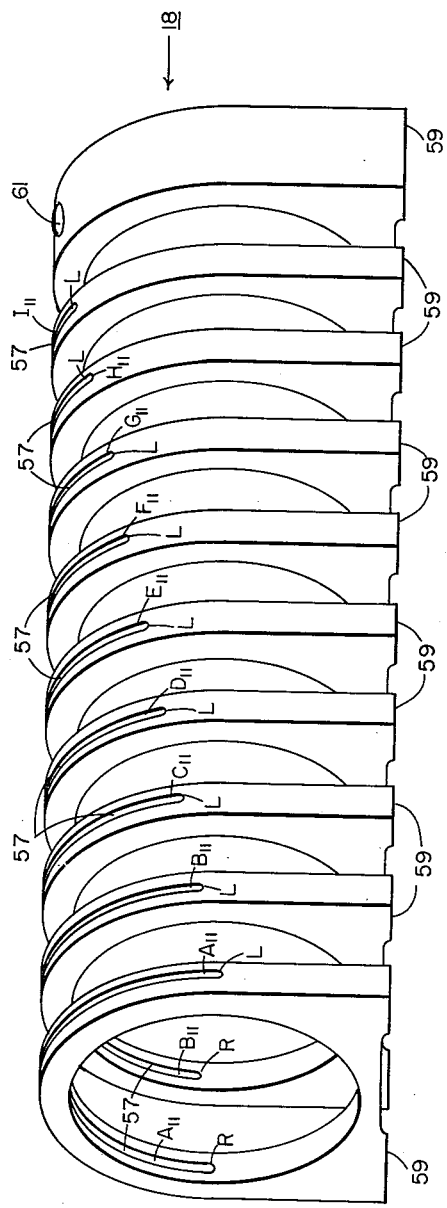
FIG. 6 is a partial isometric view of the supporting rings that fit on the actuating cylinder of FIG. 5.
Figure 7:
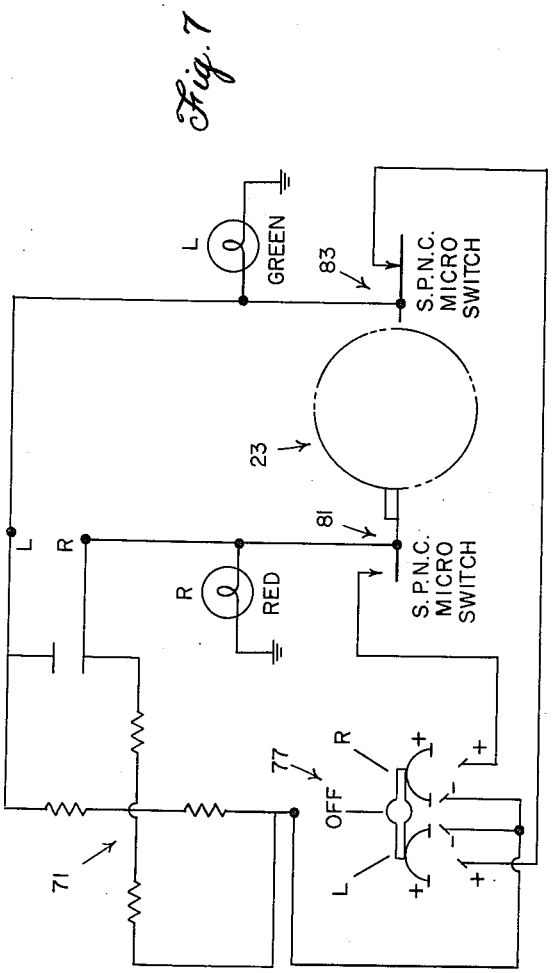
FIG. 7 is a schematic diagram of the control for the motor of the guide of FIG. 2.

In the next step of the sequence of operation, switch 77 is turned to the right position to energize motor 71 in a counter-clockwise direction. The description will again and hereinafter be referenced to a view down cylinder 51 in the direction of the beam travel, i.e., from right to left in FIGS. 2 and 5–6. Gear 73 rotates counterclockwise and meshes with the gear 75 on cylinder 51 to rotate the cylinder in a clockwise or right hand direction. The cylinder rotates 180° to the right but all of the rings A—I only rotate together with cylinder 51 during the first 20° of rotation of the cylinder. During the time when all the rings 45 are rotating with cylinder 51, pins 53 of rings A—I rotate with cylinder 51 and the pins slip in their respective slots 57 in support 59. Continued rotation of cylinder 51, after the first 20° rotation, causes the pins 53 to contact the right hand side R of the support slots 57 in sequence. After 10° more rotation, for example, pin 53 of ring I contacts the right hand side of slot $I_{11}$. After 10° more rotation of cylinder 51 to the right, pin 53 of ring H contacts the right hand side of slot $H_{11}$. After each successive 10° rotation, the pins 53 respectively of rings G, F, E, D, C, B and A successively contact the right hand end R of slots $G_{11}$, $F_{11}$, $E_{11}$, $D_{11}$, $C_{11}$, $B_{11}$ and $A_{11}$ respectively. Meanwhile, the stopped pins 53 slip sufficiently in cylinder slots $I_1$, $H_1$, $G_1$, $F_1$, $E_1$, $D_1$, $C_1$, and $B_1$, to permit cylinder 51 to complete 180° rotation, whereupon the pins are all stopped at the right end of their respective support slots 57, for example, at the position indicated by the arrangement of axes 33 in FIG. 3. In this position, ring I has been rotated 20°, ring H has been rotated 40°, ring G has been rotated 60°, ring F has been rotated 80°, ring E has been rotated 100°, ring D has been rotated 120°, ring C has been rotated 140°, ring B has been rotated 160°, and ring A has been rotated 180°.

The axes 33 of the magnets in the rings A—I are thus rotated successively to the right of the axis 33 of ring J in 10° intervals so that the total rotation of the plane of polarization of beam 18 is 90° to the right of plane X—Y. Also, at this time, the north poles of the neutrons in beam 18 are flipped so that the north pole of the neutrons in the beam 18 are 180° (i.e., antiparallel) from the north poles of the target nuclei of the target 20 and in the plane V—W. At this time pin 51 of ring A opens microswitch 81 to de-energize motor 71, and this contact of pin 51 stops the tendency of motor 71 to rotate the rings 45.

To rotate the plane of polarization of the neutrons in beam 18 back to the left again, the switch 77 is merely turned to the left position and the motor 71 rotates clockwise to turn cylinder 51 in a counter-clockwise direction. All the rings rotate with cylinder 51 during the first 20° rotation of cylinder 51. During the next 180° rotation of cylinder 51 the rings 45 are stopped sequentally by the left end L, of support slots 57. To this end, the left end L of slots 57 in support 59 contact the pins 51 of rings I—A in sequence and the rotation of the respective pins 53 is stopped by contacting the left end L of slots 57 in support 59. Also, pin 51 of ring A opens microswitch 83 to de-energize motor 71. At this point the axes 33 of the magnet pairs 27 in rings I—A are rotated successively to the left of the axis 33 of ring J in 10° intervals so that the total rotation of the plane of polarization of beam 18 is 90° to the left of plane X—Y as illustrated, for example, by FIG. 4. Also, the north pole of the neutrons in beam 18 are flipped so that the north poles of the neutrons point in the same direction as the target nuclei in the target and in the plane V—W parallel with the target nuclei so that another sequence as described above can begin.

In review of the above operation, the selective closing of switch 77 in a right hand or left hand position causes cylinder 51 selectively to rotate 180° to the right or the left and to rotate rings I—A respectively from 20° to 180° to the left or the right. The first half of the rotation brings the respective axes 33 into the plane X—Y and the second half of the rotation brings the axes 33 either to the right or the left of plane X—Y. This causes the plane of polarization of the neutrons in beam 18 automatically selectively to flip respectively 90° to the right or to the left. When the beam is flipped in one direction the polarization of the neutrons corresponds or is parallel with the polarization of the target nuclei in the target and when the beam is flipped in the opposite direction the polarization of the neutrons in the beam is opposite or anti-parallel to the polarization of the target nuclei in the target. In each case, the flipping is accomplished automatically and positively the exact same amount. Moreover, tests have shown that flipping from one direction to another can be accomplished with this invention in ten seconds or less. Also, tests have shown that the guide 23 operates successively and efficiently substantially without losing large numbers of neutrons from the beam 18 when the gaps 29 are two inches wide and the guide 23 is one foot in length. The feature that the field value is adequate with neutrons having resonance energies E of from 0.1 to 10 ev. is shown by the following table in which X corresponds to the fractional number of neutrons lost by depolarization with practical gap 29 values S and magnet strength values H:

*Table I*

| E, ev. | S, cm. | H, gauss | X |
|---|---|---|---|
| 0.1 | 30 | 200 | $4 \times 10^{-5}$ |
| 1 | 30 | 200 | $4 \times 10^{-4}$ |
| 10 | 30 | 200 | $4 \times 10^{-3}$ |

This table is derived from an evaluation in relation to the equation:

$$X = 1.4066 \times 10^4 \left(\frac{E}{SH}\right)^2$$

The described invention quickly and efficiently flips the plane of polarization of a beam of polarized neutrons in two directions exactly to a desired amount substantially without losing large numbers of neutrons from the beam. Furthermore, tests have shown that the novel guide of this invention can be used with conventional neutron sources, polarizers, and magnets in a trouble-free manner and without frequent empirical adjustments.

We claim:

1. A guide for a polarized neutron beam, comprising a plurality of magnets of constant strength directed oppositely normal to the beam axis and having adjacent poles of opposite polarity and constant strength forming coaxial gaps through which said beam freely passes, said gaps being spaced longitudinally along said beam axis at uniform, small, periodically spaced intervals and spiraling around said beam axis at uniform, small, stepped angles from the plane of polarization of said neutron beam so as uniformly to rotate the plane of polarization of said beam incrementally while transmitting uniform large numbers of the neutrons in the beam.

2. A guide for a polarized neutron beam, comprising a plurality of permanent magnets of constant strength directed oppositely normal to the beam axis and having adjacent poles of opposite polarity forming coaxial gaps through which said beam freely passes, said gaps being spaced longitudinally at uniform, small, periodically spaced intervals and spiraling around said beam axis at uniform, small, stepped angles from the plane of polarization of said neutron beam, and means for uniformly and incrementally changing the direction in which said gaps spiral around said beam axis so as selectively uniformly to rotate the plane of polarization of the neutrons in said beam incrementally to the right and to the left while transmitting uniform large numbers of the neutrons in the beam.

3. A guide for a polarized neutron beam, comprising a plurality of permanent magnets of constant strength directed oppositely normal to the beam axis and having adjacent poles of opposite polarity, curved member attached to said magnets forcing coaxial gaps through which said beam is directed, said adjacent magnet's poles being spaced longitudinally in pairs at uniform, small, periodically spaced intervals so that said gaps spiral around said beam axis at uniform, small stepped angles from the plane of polarization of said neutron beam and means for selectively moving said magnets to change the direction in which said gaps spiral around said beam axis whereby the plane of polarization of uniform large numbers of neutrons in the beam is uniformly rotated incrementally to the right and to the left.

4. A guide for a polarized neutron beam, comprising an annular support having coaxial, non-continuous first slots spaced longitudinally along the axis of said beam at uniform, small, periodically spaced intervals, the ends of the adjacent first slots being stepped at uniform, small increments on two helixes converging uniformly toward each other and a first point at one end of said support so that the length of the first slot closest to said first point is shortest and the length of the other first slots increases progressively until the first slot farthest from said first point is the longest first slot, a cylinder rotatable in said support and having coaxial, non-continuous second slots spaced longitudinally along the axis of said cylinder at uniform, small, periodically spaced intervals, the ends of adjacent second slots being stepped at uniform, small increments on two helixes diverging uniformly from each other and a second point in a plane normal to the beam axis and passing through said first point so that the length of the first slot closest to said first and second points is longest and the length of the other second slots decreases progressively until the second slot farthest from said first and second points is the shortest, rings rotatable in said cylinder and having pins on their outside that are slideably engageable in said first and second slots in said cylinder and said support, permanent magnets of substantially constant strength directed oppositely in said rings relative to said pins so that the magnets have opposite poles facing each other and forming gaps lined up in a helix through which said beam freely passes, and means for rotating said cylinder selectively to contact said pins with the opposite ends of said slots whereby said magnets are rotated to spiral said gaps in opposite directions selectively and quickly to rotate the plane of polarization of said beam uniformly and incrementally to the right and to the left substantially without removing neutrons from said beam.

References Cited in the file of this patent

"Neutron Polarization," Argonne National Laboratory—6263, November 1960, pages 7–10.

Hughes: "Pile Neutron Research," Addision-Wesley Publishing Company, Inc., 1953, pages 319–326.

Staub et al.: "The Signs of the Magnetic Moments of Neutrons and Protons," Helvetica Physica ACTA, vol. 22, pages 63–92, 1950.